(12) United States Patent
McCusker

(10) Patent No.: US 8,495,722 B1
(45) Date of Patent: Jul. 23, 2013

(54) METHOD AND SYSTEM FOR CONTROLLING ACCESS TO AN AIRCRAFT-BASED WIRELESS NETWORK

(75) Inventor: Patrick D. McCusker, Walker, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 503 days.

(21) Appl. No.: 12/567,529

(22) Filed: Sep. 25, 2009

(51) Int. Cl.
G06F 15/16 (2006.01)

(52) U.S. Cl.
USPC ............ 726/10; 726/2; 726/4; 726/5; 726/9

(58) Field of Classification Search
USPC ............ 726/4, 9, 10, 2, 5; 244/118.5; 701/3, 701/32.6
See application file for complete search history.

(56) References Cited

U.S. PATENT DOCUMENTS

| | | | |
|---|---|---|---|
| 7,440,591 B1 | 10/2008 | McCusker | |
| 7,580,776 B1 | 8/2009 | McCusker et al. | |
| 7,586,869 B2 | 9/2009 | Johnson et al. | |
| 7,633,428 B1 | 12/2009 | McCusker et al. | |
| 7,633,430 B1 | 12/2009 | Wichgers et al. | |
| 7,708,189 B1 * | 5/2010 | Cipriano | 235/375 |
| 2003/0109973 A1 * | 6/2003 | Hensey et al. | 701/35 |
| 2009/0327701 A1 * | 12/2009 | Holz | 713/155 |
| 2010/0287601 A1 * | 11/2010 | Croize | 726/4 |

FOREIGN PATENT DOCUMENTS

WO  WO 2008/145934 A1 * 12/2008

* cited by examiner

*Primary Examiner* — Edward Zee
*Assistant Examiner* — Baotran N To
(74) *Attorney, Agent, or Firm* — Donna P. Suchy; Daniel M. Barbieri

(57) ABSTRACT

A system for controlling access to an aircraft system by a portable electronic device attempting to connect to the aircraft system via an aircraft-based wireless network includes a reader configured to read first identification information from a first device. The system further includes communications electronics for the aircraft-based wireless network configured to receive second identification information from the portable electronic device. The system yet further includes a processing circuit configured to receive the first identification information from the reader and the second identification information from the communications electronics and to compare the first and second identification information. The processing circuit is configured to grant access to the aircraft system when the comparison indicates a match between the first and second identification information.

20 Claims, 4 Drawing Sheets

METHOD AND SYSTEM FOR CONTROLLING ACCESS TO AN AIRCRAFT-BASED WIRELESS NETWORK

BACKGROUND

The present invention relates generally to the field of aircraft systems and aircraft-based wireless networks.

Aircraft-based wireless networks can be used to provide access to aircraft systems such as an onboard maintenance system (OMS), an adaptive flight display system (AFD), a cabin crew system, a passenger entertainment system, a hospitality inventory system, an aircraft flight plan or navigation system, and/or other aircraft systems. Applicants have found it challenging and difficult to securely authenticate, using conventional systems, the many users that may want to access aircraft systems via the aircraft-based wireless networks.

SUMMARY

One embodiment of the invention relates to a system for controlling access to an aircraft system by a portable electronic device attempting to connect to the aircraft system via an aircraft-based wireless network. The system includes a reader configured to read first identification information from a first device. The system further includes communications electronics for the aircraft-based wireless network configured to receive second identification information from the portable electronic device. The system yet further includes a processing circuit configured to receive the first identification information from the reader and the second identification information from the communications electronics and to compare the first and second identification information. The processing circuit is configured to grant access to the aircraft system when the comparison indicates a match between the first and second identification information.

Another embodiment of the invention relates to a method for controlling access to an aircraft system by a portable electronic device attempting to connect to the aircraft system via an aircraft-based wireless network. The method includes receiving, at a processing circuit, first identification information from a reader configured to read the first identification information from a first device. The method further includes receiving, at a processing circuit, second identification information from communications electronics configured to receive the second identification information from the portable electronic device. The method yet further includes using the processing circuit to compare the first and second identification information and granting access to the aircraft system when the comparison indicates a match between the first and second identification information.

Yet another embodiment of the invention relates to an apparatus for controlling access to an aircraft system by a portable electronic device attempting to connect to the aircraft system via an aircraft-based wireless network. The apparatus includes means for receiving first identification information from a reader configured to read the first identification information from a first device. The apparatus yet further includes means for receiving second identification information from communications electronics configured to receive the second identification information from the portable electronic device. The apparatus also includes means for comparing the first and second identification information. The apparatus yet further includes means for granting access to the aircraft system when the comparison indicates a match between the first and second identification information.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the Figures, systems and methods for controlling access to an aircraft system accessible via an aircraft-based wireless network are shown and described. The systems and methods generally complete the authentication of a portable electronic device by comparing identification information of two devices a user has: (1) the portable electronic device attempting to access the network and (2) a badge, card, or other identifying device. The systems and methods may also authenticate the portable electronic device for access to the network using something the user knows (e.g., a password to the portable electronic device, a password to the network, a password to the aircraft system). In various exemplary embodiments of the present application, the system for authentication does not check user credentials received from the portable electronic device with a centralized authentication server or system remotely located from the aircraft.

Figure 1:
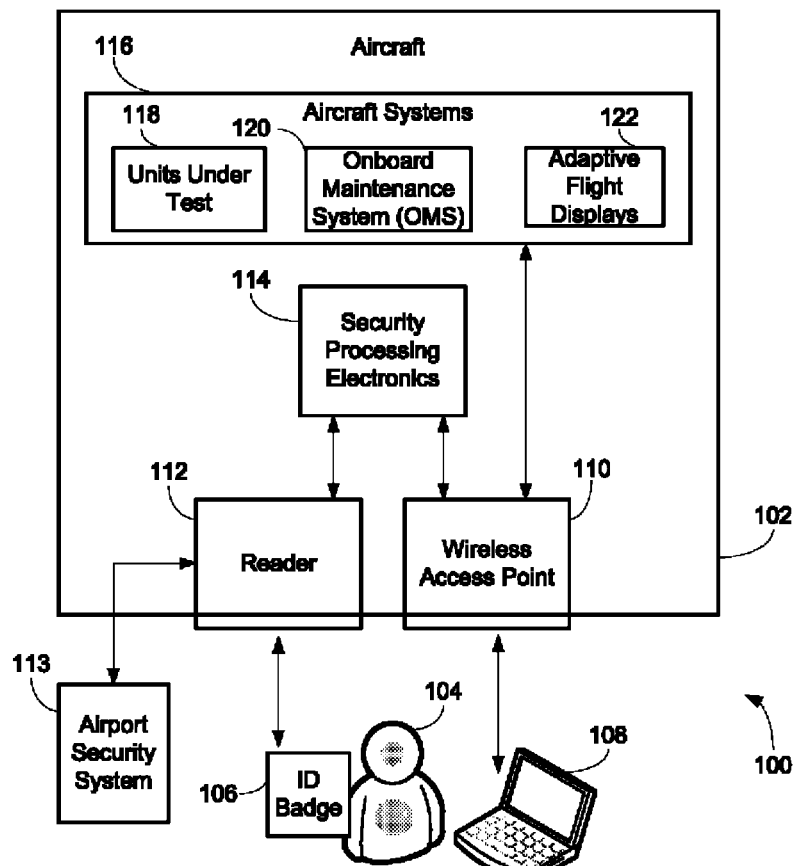
FIG. 1 is a block diagram of a system for controlling access to an aircraft system accessible via an aircraft-based wireless network, according to an exemplary embodiment.

Referring now to FIG. 1, a block diagram of a system 100 for controlling access to aircraft systems 116 accessible via an aircraft-based wireless network is shown, according to an exemplary embodiment. User 104 (e.g., pilot, maintenance technician, etc.) would like to access aircraft systems 116 via a portable electronic device 108 and a wireless network provided by wireless access point 110 on aircraft 102. For example, user 104 may be a maintenance technician desiring to access aircraft 102's onboard maintenance system 120 while user 104 walks around the aircraft with portable electronic device 108. Security processing electronics 114 are configured to grant portable electronic device 108 access to aircraft systems 116 when a comparison between first identification information received at a reader 112 matches second identification information received from portable electronic device 108 at wireless access point 110. Accordingly, in the exemplary embodiment shown in FIG. 1, user 104 walks up to reader 112 and scans ID badge 106 at reader 112. Within a period of time before, during, or after the scan, when portable electronic device 108 communicates identification information for user 104 or device 108 to wireless access point 110 that matches the identification information received via ID badge 106, security processing electronics 114 grants access to portable electronic device 108.

Reader 112 may be configured to communicate with ID badge 106 via radio-frequency identification (RFID) technology or near-field communication (NFC) technology. In other embodiments, other short range radio communications technologies are used by reader 112. In yet other exemplary embodiments, reader 112 is configured to communicate with ID badge 106 using visual or contact-based reading technologies (e.g., bar code scanning). Reader 112 may be located near an entrance to aircraft 102 (e.g., just inside the front most door of the aircraft, just inside a service bay), may be located in or near the cockpit, or may be located at any other location on or in aircraft 102. While device 106 is described as being a badge, it should be appreciated that a device or circuit for providing identification information to reader 112 may be of any technology suitable with the various embodiments of reader 112. Further device 106 may not be formed as a badge in some embodiments but may rather be formed as a patch, a button, integrated with a key fob or key, embedded on or within human skin, printed on a card or other substrate, or otherwise formed.

Reader 112 is shown in FIG. 1 as being communicably coupled to airport security system 113. When user 104 holds his or her ID badge 106 near reader 112 so that reader 112 reads information from ID badge 106, reader 112 may be configured to validate the information or recall additional information from airport security system 113. For example, memory of ID badge 106 may not store an identity or identification information for user 104. Rather, reader 112 may pass a key or unique string of information provided by ID badge 106 to airport security system 113 for looking up identification information of user 104 associated with badge 106. In other embodiments, airport security system 113 validates ID badge 106 and returns identification information not descriptive of user 104 back to reader 112. The identification information returned back to reader 112 from airport security system 113 may be encrypted or provided back to reader 112 in the form of a token that security processing electronics 114 can recognize.

Reader 112 is configured to provide security processing electronics 114 with identification information relating to ID badge 106 or user 104. The information may be obtained directly from ID badge 106, derived from ID badge 106 by logic of reader 112, retrieved from airport security system 113, looked up by reader 112, or obtained in another way by reader 112. The identification information may be provided to security processing electronics 114 in the form of a number, a string of text, an encrypted signal, a token having an encrypted portion, an XML message or other self-describing message, or in any other form.

The portable electronic device 108 for which user 104 is seeking to have access aircraft systems 116 is shown as a laptop computer in FIG. 1. In other embodiments, portable electronic device 108 may be a personal digital assistant (PDA), a mobile phone, a tablet PC, or any other device configured to communicate with other electronic systems via wireless communications. Portable electronic device 108 may communicate with wireless access point 110 via wireless communications according to one or more wireless communications protocols (e.g., IEEE 802.11, IEEE 802.15, Bluetooth, Zigbee, WiFi, WiMax, municipal WiFi, etc.) compatible with wireless access point 110 or another wireless transceiver associated with aircraft 102. Portable electronic device 108 may include processing electronics (e.g., processor, memory, etc.) configured to execute one or more applications that are stored local to portable electronic device 108. In other embodiments, portable electronic device 108 may include a "thin" browser or client configured to access applications served by aircraft systems 116, security processing electronics 114, wireless access point 110, or another aircraft system (e.g., a web server located on aircraft 102 and in communication with wireless access point 110). Whether operating with a "thick" application or a "thin" client, portable electronic device 108 may be configured to prompt a user of portable electronic device 108 for identification information (e.g., a username, a personal identification number, a password, a keyphrase, an authentication code, etc.) and can send the identification information to wireless access point 110 for use (e.g., for decoding, for providing to security processing electronics 114, etc.).

Wireless access point 110 may be or include communications electronics (e.g., transmitter and receiver, transceiver, wireless radio, etc.) configured to communicate with one or more compatible wireless devices such as portable electronic device 108 via wireless data communications. Wireless access point 110 may be configured to communicate via one or more wireless data communications protocols (e.g., Bluetooth, Zigbee, WiFi, a mobile phone protocol, one or more proprietary protocols, etc.). Wireless access point 110 can be configured to receive identification information from portable electronic device 108 and to pass the identification information to security processing electronics 114 (e.g., via an Ethernet connection, via a wireless connection, etc.). Wireless access point 110 may process identification information received from portable electronic device 108 to provide a first level of security. For example, portable electronic device 108 may be configured to provide a passcode (e.g., encrypted, unencrypted, etc.) to wireless access point 110 before wireless access point 110 will allow communications with portable electronic device 108. In other embodiments, wireless access point 110 provides identification information received from portable electronic device 108 to security processing electronics 114 prior to allowing further wireless network communications by portable electronic device 108. For example, wireless access point 110 may be configured to provide identification information received from portable electronic device 108 to security processing electronics 114 for matching to identification information from reader 112 prior to allowing portable electronic device 108 to "join" or otherwise regularly "connect to" wireless access point 110 or the wireless network provided or supported by access point 110.

Security processing electronics 114 is a computer-based system configured to receive first identification information from reader 112 and second identification information received from wireless access point 110 and to compare the received identification information to authenticate portable electronic device 108 for access to aircraft systems 116. Security processing electronics 114 may be an application server, a web server, or another type of server onboard aircraft 102. Security processing electronics 114 is shown in greater detail in FIG. 4.

Aircraft systems 116 are shown to include units under test 118, an onboard maintenance system (OMS) 120, and adaptive flight displays 122. Aircraft systems 116 may include other systems such as flight or cabin crew systems, cabin entertainment systems, cabin hospitality systems, avionics electronics, radar systems, communications systems, or any other aircraft system that may be accessed remotely via data communications. Units under test 118 may be or include particular aircraft components or systems that are being tested by a mechanic (e.g., user 104, OMS 120, a fault detection and diagnostics systems of the aircraft, portable electronic device 108, other systems, etc.). In an exemplary embodiment, units under test 118 are communicably coupled to OMS 120 and are configured to provide signals to OMS 120 that can be used for troubleshooting, checkup, or maintenance purposes. For example, units under test 118 may include a brake system for the aircraft including one or more sensors configured to detect brake position and to make the brake position available on a wire bus in the aircraft. OMS 120 may retrieve the brake position from the wire bus and make its value available, for example, to wireless access point 110 for communication to portable electronic device 108. Portable electronic device 108 may be configured to display the received information on a text-based or graphic-based interface so that user 104 can check or diagnose the brakes. In some embodiments OMS 120 or other aircraft systems 116 may be configured to change values or states based on data received from portable electronic device 108 via wireless access point 110. Adaptive flight displays 122 may include cockpit avionics systems configured to provide information to pilots during flight. Adaptive flight displays 122 may be configured to make fault information, flight information for previous flights, or other information available to portable electronic device 108 via wireless access point 110 when appropriate access is granted to portable electronic device 108.

Figure 2:
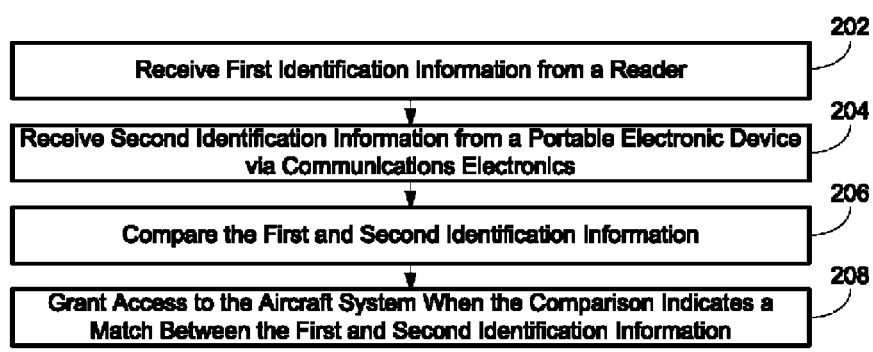
FIG. 2 is a flow chart of a process for controlling access to an aircraft system accessible via an aircraft-based wireless network, according to an exemplary embodiment.

FIG. 2 is a flow chart of a process 200 for controlling access to an aircraft system accessible via an aircraft-based wireless network, according to an exemplary embodiment. Process 200 may be an algorithm completed by, for example, security processing electronics 114 or another processing circuit located on the aircraft and configured to grant or restrict access to a wireless network, a wireless resource, or an aircraft system. The steps of process 200 may be embodied as computer code instructions on a computer readable medium (e.g., CDROM, flash memory, hard-drive based memory, solid state memory, etc.) of such a device and configured to conduct or facilitate the activities of each step when the instructions are executed by a processing circuit.

Process 200 is shown to include receiving first identification information from a reader (step 202). The first identification information may be read from a first portable device. In other embodiments, the first identification information may be calculated or obtained (e.g., from an airport security system) based on information received from the first portable device.

Process 200 further includes receiving second identification information from a portable electronic device via communications electronics (step 204). The communication electronics may be, for example, those of a wireless access point for a wireless network hosted by the aircraft. In some embodiments, the second identification information may be calculated by the communications electronics based on information received from the portable electronic device. For example, information received from the portable electronic device may be decrypted by the communications electronics to extract the second identification information.

Process 200 is further shown to include comparing the first and second identification information (step 206). Access is granted to the aircraft system when the comparison indicates a match between the first and second identification information (step 208). The comparison of step 206 can be or include activities other than a straight character-by-character comparison of the information. For example, the comparison of step 206 may include transforming one or both of the first information and the second information and comparing that transformation to the other information. For example, the first information received from the reader may be truncated, decrypted, or shifted and that transformation result may be compared to the second identification information received from the wireless access point. In another example, the comparison may include looking up another value based on either of the first information or the second information and comparing that looked up value. Accordingly, the matching of step 208 can be or include an exact character match or other levels or types of matching. For example, the matching of step 208 can include checksum matching, prefix matching, matching using one or more of the first information and the second information in a decrypting process, or by conducting any other logic configured to indicate whether the first information and the second information are related or associated in an expected or acceptable way. Granting access can mean granting access to communicate on a wireless network, to communicate via a wireless access point of the aircraft, to communicate through a gateway (e.g., the security processing electronics may be, may be a part of, or serve as the gateway), or whether to grant access in another way to the aircraft systems.

Figure 3:
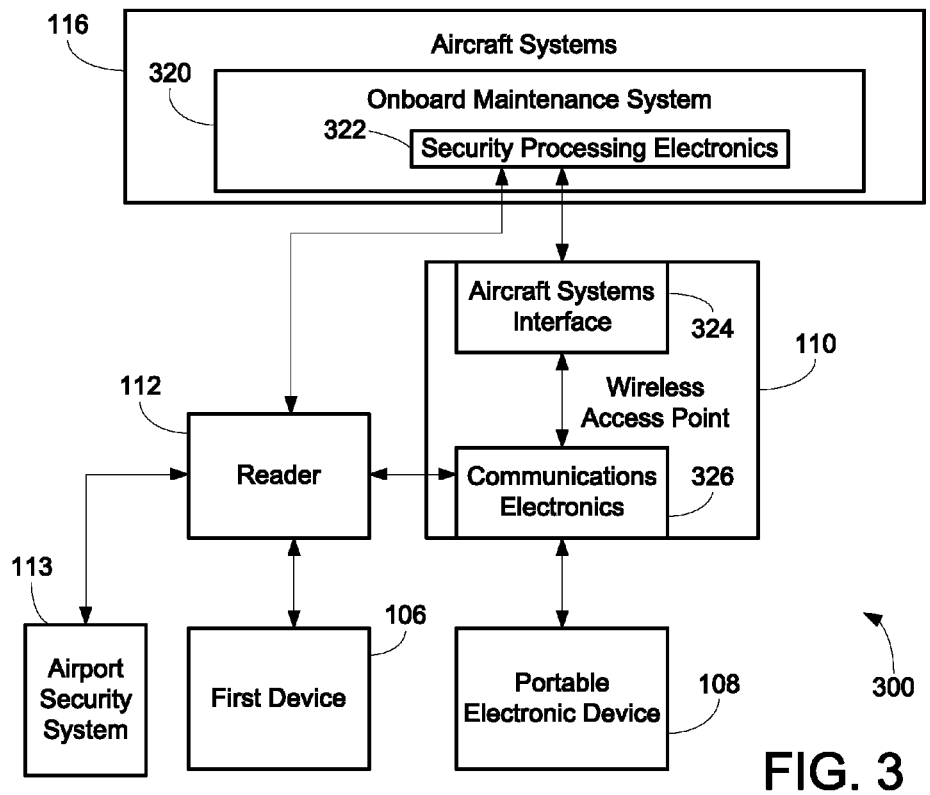
FIG. 3 is a block diagram of a system for controlling access to an aircraft system accessible via an aircraft-based wireless network, according to another exemplary embodiment.

Referring now to FIG. 3, a block diagram of a system 300 for controlling access to an aircraft system accessible via an aircraft-based wireless network is shown, according to another exemplary embodiment. In the embodiment shown in FIG. 3, security processing electronics 322 is shown as a component of onboard maintenance system 320. Security processing electronics 322 may interface (e.g., via a communications bus, an Ethernet network, a wireless network) with wireless access point 110 via aircraft systems interface 324 of wireless access point 110. Wireless access point 110 is shown in greater detail relative to the version shown in FIG. 1 and is shown to include communications electronics 326. Communications electronics 326 may be or include any of the electronics or software described above for communicating with portable electronic device 108 via wireless communications. Communications electronics 326 is also shown in communication with reader 112. For example, reader 112 may communicate with communications electronics 326 via a wireless connection. In other embodiments, reader 112 communicates with wireless access point 110 via a wired connection. FIG. 3 illustrates that the first identification information associated with first device 106 and the second identification information associated with portable electronic device 108 may be received by security processing electronics 322 in a variety of different ways according to different embodiments of the present invention.

Figure 4:
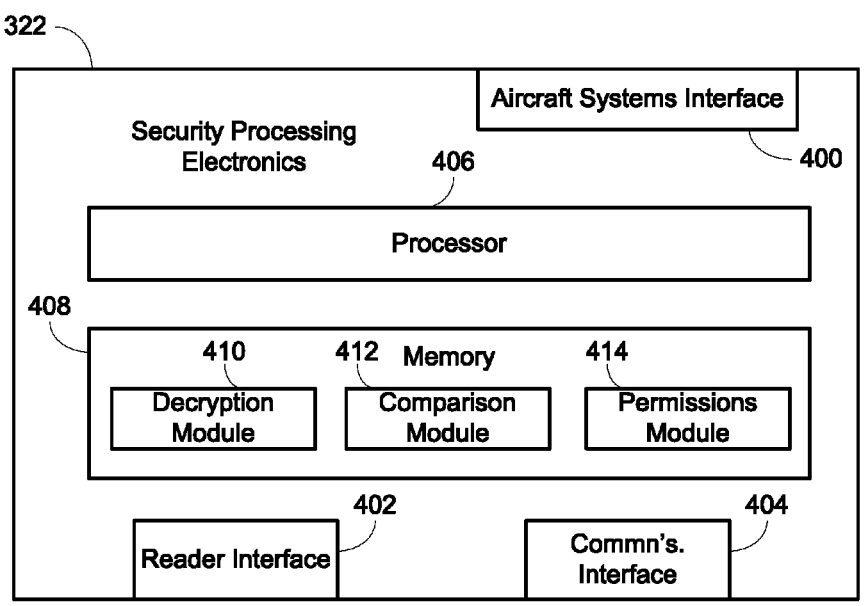
FIG. 4 is a block diagram of security processing electronics, according to an exemplary embodiment.

Referring now to FIG. 4, a detailed a block diagram of security processing electronics 322 from FIG. 3 is shown, according to an exemplary embodiment. Security processing electronics 322 is shown to include an aircraft systems interface 400, a processor 406, memory 408, a reader interface 402, and a communications interface 404.

Aircraft systems interface 400 is a terminal, circuitry, software or combination thereof for communicating with one or more aircraft systems. For example, aircraft systems interface 400 may include a service for sending and receiving communications on an aircraft data network (ADN), an avionics full-duplex switched Ethernet (AFDX) network, an ARINC network, an Ethernet network, etc.

Processor 406 may be a general or specific purpose processor configured to execute computer code or instructions stored in memory 408 or received from other computer readable media (e.g., CDROM, network storage, a remote server, etc.). Memory 408 may be RAM, hard drive storage, temporary storage, non-volatile memory, flash memory, optical memory, or any other suitable memory for storing software objects and/or computer instructions. When processor 406 executes instructions stored in memory 408 for completing the various activities described herein, processor 406 generally causes security processing electronics 322 to complete such activities. Modules 410, 412, and 414 within memory 408 may be scripts, functions, executables, or other sets of computer code or instructions for execution by processor 406. When executed, modules 410, 412, and 414 configure processor 406 or more generally security processing electronics 322 for the activities described herein. Decryption module 410, for example, is configured to decrypt communications received at aircraft systems interface 400, reader interface 402, and/or communications interface 404. Comparison module 412 is configured to receive or otherwise access the first identification information received at reader interface 402 and the second identification information received at communications interface 404 and to conduct the comparison of the information (e.g., as described with reference to process 200 shown in FIG. 2, etc.). Permissions module 414 is configured to check identification information received from either or both of reader interface 402 and communications interface 404 for whether the identified user is permitted to access the wireless network, aircraft systems, or other resources. In some embodiments permissions module 414 may not be configured to provide different sets of permissions for different particular users but may rather be configured to identify a user as being associated with a permissions group. For example, a "pilot" group may be granted different access to avionics information than a "pre-flight inspector" group. It should be noted that other modules may be stored in memory 408 for executing one or more of the activities described in the present application.

Reader interface 402 may be any set of hardware or software jacks, terminals, circuitry, software or any combination thereof for receiving data from reader 112. For example, reader interface 402 may be an Ethernet-based interface, an optical/digital interface, an analog interface, a USB interface, or any other suitable interface for receiving data from the types of readers described above or from a network between the reader and security processing electronics 322. Communications interface 404 may be an Ethernet interface, an avionics bus, an optical/digital interface, or any other suitable interface for communicating with, for example, a network in the aircraft, a wireless access point in the aircraft, or other communications electronics configured to receive information from portable electronic device 108.

Figure 5:
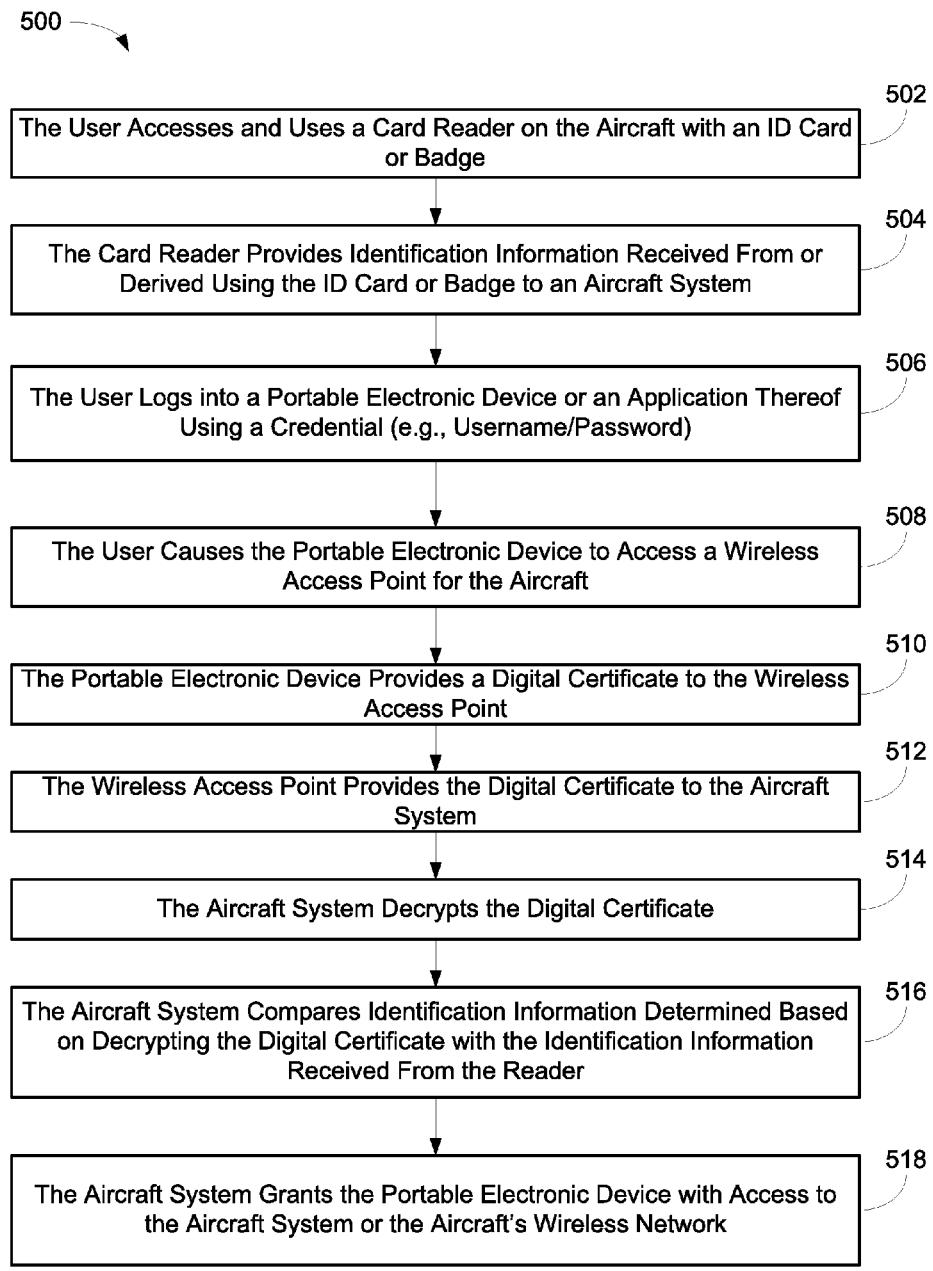
FIG. 5 is more detailed flow chart of a process for controlling access to an aircraft system accessible via an aircraft-based wireless network, according to an exemplary embodiment.

Referring now to FIG. 5, a detailed flow chart of an exemplary process 500 for controlling access to an aircraft system accessible via an aircraft-based wireless network is shown, according to an exemplary embodiment. Process 500 is shown to include a user accessing and using a card reader on the aircraft with an ID card or badge (step 502). The reader uses information from the card or badge (or obtained in conjunction with another system such as an airport security system) to provide identification information to an aircraft system (e.g., a security processing system, an aircraft communications gateway, an aircraft wireless access point, etc.) (step 504). The user then logs into a portable electronic device or an application thereof using one or more credentials (e.g., a username and password combination) (step 506). This user may then use an application (e.g., an aircraft service application, a connection manager, etc.) to access a wireless access point for the aircraft (step 508). This access may include the portable electronic device providing a digital certificate, encrypted key, or another credential to the wireless access point (step 510). The wireless access point may decrypt the digital certificate using its circuitry or may pass the digital certificate to another aircraft system (e.g., communications gateway, OMS, security system, etc.) for processing and decryption (step 512). If the digital certificate is provided to another aircraft system such as security processing electronics, the aircraft system decrypts the digital certificate (step 514). The aircraft system (e.g., security processing system, OMS, communications gateway, etc.) then compares identification information determined from the digital certificate with identification information received from the reader (step 516). If the identification matches (or otherwise correlates in a way to indicate authentication), the aircraft system grants the portable electronic device with access to the aircraft system or the aircraft's wireless network (step 518).

While some embodiments described herein relate to a maintenance provider accessing the aircraft network or an aircraft system to perform maintenance tasks, it should be noted that access to many different types of networks and systems may be controlled according to the present invention. For example, a system of the present invention may be used to control access to aircraft avionics systems or other aircraft systems by a flight crew member carrying a portable electronic flight bag (e.g., a laptop computer, a custom "netbook", a personal digital assistant, etc.). In such an embodiment, the reader may be located, for example, in or near the cockpit. The "badge" read by the reader may be an identity card, a key fob or other object/device that only an authorized flight crew member should have. In another example, a system of the present invention may be used to control access to cabin controls such as cabin lighting. In this example, the cabin crew may carry remote controls, personal digital assistants, or other portable electronic devices for interacting with one or more cabin control systems (e.g., a lighting system, a ventilation system, an entertainment system, a cabin education/safety media system, a warning light system, a cabin announcement system, a security alert system, etc.). A reader for the cabin crew may be located near a cabin door, a cabin service area, in the cockpit, or near another location of the aircraft. Yet further, a system of the present invention may be used to control access to onboard fuel systems or catering systems that are accessed by third party service providers. In such a system, the reader may be located near or on the exterior of the aircraft, in a service bay, near a catering lift, or otherwise.

Figure 6:
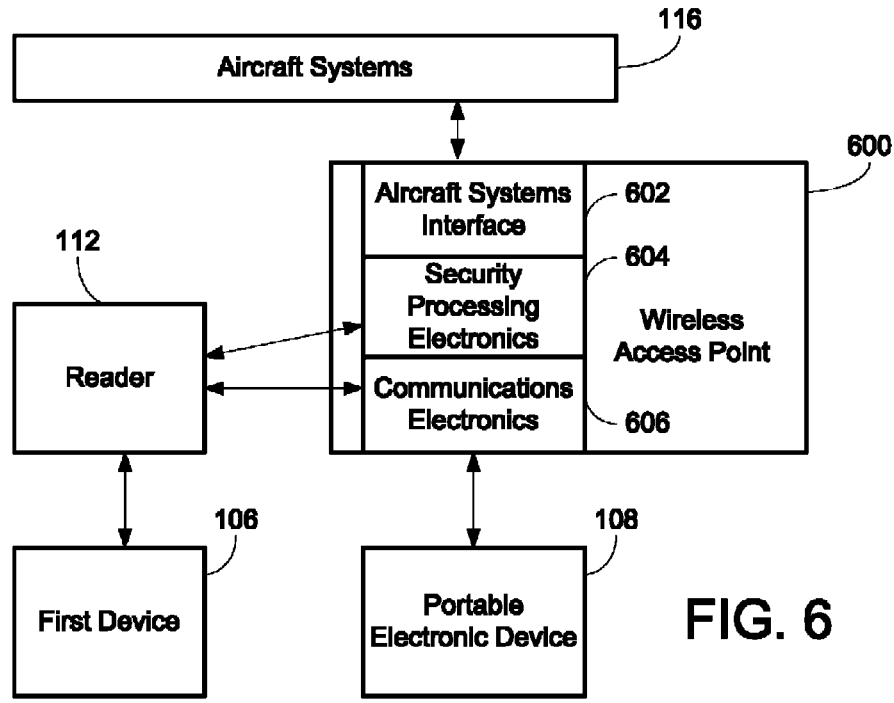
FIG. 6 is a block diagram of a system for controlling access to an aircraft system accessible via an aircraft-based wireless network, according to another exemplary embodiment.

Referring now to FIG. 6, a block diagram of a system for controlling access to an aircraft system accessible via an aircraft-based wireless network is shown, according to another exemplary embodiment. In the system shown in FIG. 6, the security processing electronics 604 are integrated with a wireless access point 600 and closely coupled to aircraft systems interface 602 and communications electronics 606. Security processing electronics 604 may be configured to prevent access beyond wireless access point 600 to portable electronic device 108 unless credentials are matched with those from reader 112. Reader 112 may communicate directly with security processing electronics 604 (e.g., via a standard or proprietary wired connection) or communicate with security processing electronics 604 via communications electronics 606.

Figure 7:
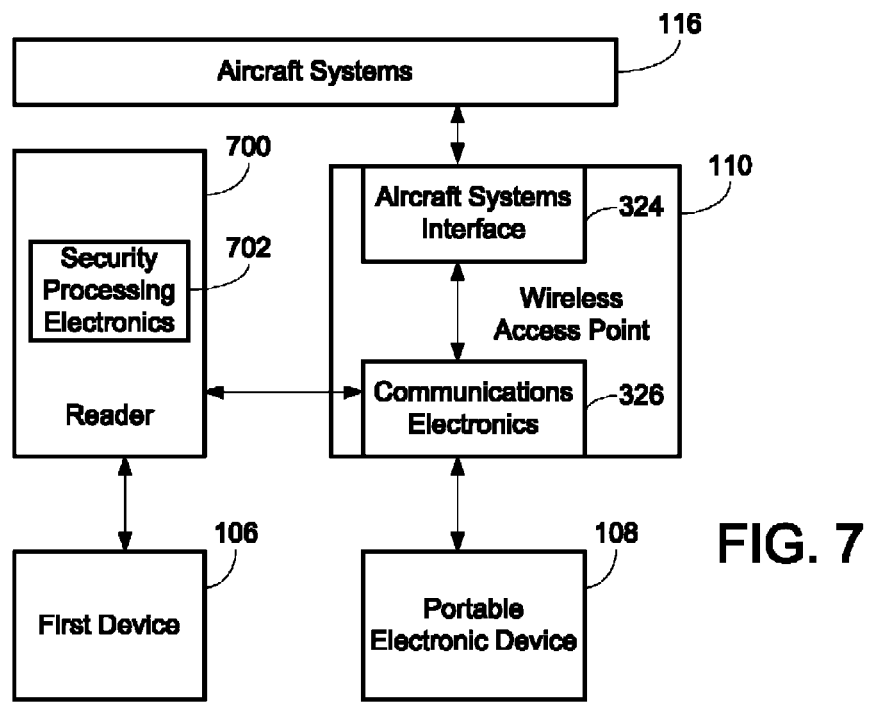
FIG. 7 is a block diagram of a system for controlling access to an aircraft system accessible via an aircraft-based wireless network, according to another exemplary embodiment.

Referring now to FIG. 7, a block diagram of a system for controlling access to an aircraft system accessible via an aircraft-based wireless network is shown, according to another exemplary embodiment. In the system shown in FIG. 7, the security processing electronics 702 are integrated or closely coupled to reader 700. In this embodiment, attempted accesses by portable electronic devices result in identification information being sent from wireless access point 110 to security processing electronics 702 and reader 700 for checking against identification received at reader 700. It should be noted that architectures beyond those shown in the Figures may be provided without departing from the scope of the present disclosure or the appended claims.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling access to an aircraft system by a portable electronic device attempting to connect to the aircraft system via an aircraft-based wireless network, the system comprising:
 a reader configured to read first identification information from a first device, the first device and the first identification information associated with a user of the portable electronic device;
 communications electronics for the aircraft-based wireless network configured to receive a digital certificate associated with second identification information from the portable electronic device, the second identification information identifying the portable electronic device; and
 a processing circuit configured to receive the first identification information from the reader and the second identification information from the portable electronic device via the communications electronics and to compare the first and second identification information;
 wherein the processing circuit is configured to grant access to the aircraft system in response to a match of the first and second identification information, wherein the portable electronic device requires a user name and password for provision of the digital certificate, wherein the portable electronic device provides the digital certificate to the communications electronics, the processing circuit performing decryption using the digital certificate to obtain the second identification information.

2. The system of claim 1, wherein the user causes the second identification information is transmitted to the communications electronics from the portable electronic device in an encrypted message; and
 wherein the processing circuit is further configured to decrypt the encrypted message to obtain the second identification information.

3. The system of claim 2, wherein the encrypted message is a digital certificate.

4. The system of claim 3, wherein the communications electronics are configured to check credentials received from the portable electronic device before accepting and decrypting the digital certificate.

5. The system of claim 1, wherein the processing circuit does not communicate with another authentication system to determine whether the portable electronic device should be allowed to access the aircraft system.

6. The system of claim 1, wherein the reader is configured to communicate with the first device via at least one of radio-frequency identification (RFID) and near field communication (NFC) technology.

7. The system of claim 1, wherein the reader is in communication with airport security system, wherein the airport security system receives a key from the first device and provides the first identification information to the reader in response to the key.

8. The system of claim 1, wherein the processing circuit is integrated with at least one of the aircraft system, the communications electronics, and circuitry associated with the reader and the reader is at least one of a card or badge reader and wherein the first device is at least one of a card and badge with passive or active circuitry.

9. The system of claim 1, wherein the communications electronics comprise a wireless access point for the aircraft-based wireless network and are configured to communicate via an IEEE 802.11 compatible protocol and the portable electronic device is at least one of a laptop computer, a mobile phone, and a personal digital assistant.

10. The system of claim 1, wherein the first information includes a token recognized by an airport aircraft security system associated with the processing circuit.

11. A method for controlling access to an aircraft system by a portable electronic device attempting to connect to the aircraft system via an aircraft-based wireless network, the method comprising:
- receiving, at the processing circuit, first identification information from a reader configured to read the first identification information from a first device, the first device and the first identification information associated with a user of the portable electronic device;
- receiving, at a processing circuit, second identification information from communications electronics configured to receive a digital certificate associated with the second identification information from the portable electronic device, the second identification information associated with the portable electronic device;
- using the processing circuit to compare the first and second identification information; and
- granting access to the aircraft system in response to a match of the first and second identification information, wherein the portable electronic device requires a user name and password for provision of the digital certificate, wherein the portable electronic device provides the digital certificate to the communications electronics, the processing circuit performing decryption using the digital certificate to obtain the second identification information.

12. The method of claim 11, wherein the second identification information is transmitted to the communications electronics from the portable electronics device in an encrypted message; and
- wherein the method further comprises decrypting the encrypted message to obtain the second identification information.

13. The method of claim 12, wherein the encrypted message is a digital certificate.

14. The method of claim 13, wherein the communications electronics are configured to check credentials received from the portable electronic device before at least one of accepting and decrypting the digital certificate.

15. The method of claim 11, further comprising:
- at the portable electronic device, requesting a credential from a user via a graphical user interface.

16. The method of claim 15, further comprising:
- checking the credential at the portable electronic device prior to allowing the user to further access the portable electronic device.

17. The method of claim 16, further comprising:
- checking the credential at the processing circuit prior to comparing the first identification information to the second identification information.

18. The method of claim 17, further comprising:
- at the processing circuit, receiving a digital certificate from the portable electronic device via the communications electronics; and
- at the processing circuit, decrypting the digital certificate using the credential.

19. The method of claim 15, wherein the credential comprises at least a password for the user, a password for the aircraft-based wireless network, and a password for the aircraft system.

20. An apparatus for controlling access to an aircraft system by a portable electronic device attempting to connect to the aircraft system via an aircraft-based wireless network, the apparatus comprising:
- means for receiving first identification information from a reader configured to read the first identification information from a first device, the first device and the first identification information associated with a user of the portable electronic device;
- means for receiving second identification information from communication electronics configured to receive a digital certificate associated with the second identification information from the portable electronic device, the second identification information associated with the portable electronic device;
- means for comparing the first and second identification information; and
- means for granting access to the aircraft system when the comparison indicates a match between the first and second identification information, wherein the portable electronic device requires a user name and password for provision of the digital certificate, wherein the portable electronic device provides the digital certificate to the communications electronics, the processing circuit performing decryption using the digital certificate to obtain the second identification information.

* * * * *